Patented Mar. 14, 1950

2,500,427

UNITED STATES PATENT OFFICE 2,500,427

MOISTUREPROOFING COMPOSITIONS

Joe E. Moose, Reno, Nev., assignor to Monsanto Chemical Company, St. Louis, Mo., a corporation of Delaware No Drawing. Original application May 24, 1946, Serial No. 672,161. Divided and this application August 22, 1949, Serial No. 111,757

2 Claims. (Cl. 106—230)

This invention relates to a new composition of matter and particularly to a wax composition containing a natural or synthetic wax in combination with a material selected from the group consisting of terphenyls, mixtures of terphenyls, hydrogenated terphenyls and N-xenyl stearamides.

An object of the invention is to provide a stable wax composition of improved moisture- and water-resistant properties.

An additional object is to provide an improved wax-containing coating and impregnating composition for moistureproofing paper, fabrics, and similar porous fibrous materials.

A further object is to provide a hot dip coating for artificial flowers, artificial fruit and other decorative articles.

A still further object is to provide a hot dip coating for artificial flowers which is characterized by the property of stiffening the petals without leaving thick edges, and of imparting a pleasing translucent appearance thereto.

Other objects will be apparent to those skilled in the art as the description proceeds.

Heretofore, numerous materials have been incorporated with waxes to modify their properties so as to render them more suitable for use as coating and impregnating materials.

For example, synthetic resins, natural resins and derivatives thereof have been incorporated with waxes to increase their resistance to moisture and to harden them and thereby decrease their tendency to smear. The resulting compositions, however, have not been entirely satisfactory as in some instances the modifying material possessed a low order of compatibility with the wax, and this led to the formation of products of uneven consistency, which were cloudy in appearance. Moreover, when applied as a coating to a given base, these compositions were unstable as the modifying material separated from the mixture by crystallization, thus impairing the appearance of the coating and the coated product. Another difficulty encountered with the above compositions has been the phenomenon known as "delayed blushing." Thus, a selected wax modifier, when incorporated with the wax base, appeared to be compatible therewith, only to separate by crystallization within a few weeks or months after the wax-containing coating composition had been applied. This separation on the part of the modifier not only impaired the appearance of the coating but also its hardness and resistance to moisture transmission.

In addition to overcoming the above-described objectionable features of prior wax compositions, the present invention is concerned with the narrower and more specialized problem of providing a satisfactory hot dip coating for artificial flowers and the like.

One of the requirements of such a coating is that its dipping temperature should be such that the excess wax readily drain from the flower before it solidifies on the petals, and the resulting product should have no thick wax edges after the wax has solidified.

Another requirement is that the wax coating composition should stiffen the petals but have sufficient flexibility to permit the petals to yield somewhat when a bending stress is applied.

An additional requirement is that, after application to the flowers, the coating should be sufficiently dull and translucent to permit the bright colors to show through without imparting an artificial appearance to the flowers.

A further requirement is that the wax coating should be of such consistency that the lines or raised portions of the paper used in making flowers are more or less completely obliterated, since these lines or raised portions are not present in natural flowers.

I have now found that if waxes or wax-like substances are combined with a modifying material selected from the group consisting of terphenyls, mixtures of terphenyls, hydrogenated terphenyls and N-xenyl stearamides, compositions fulfilling the above objectives and requirements are obtained in which the disadvantages hereinbefore described are either substantially reduced or completely eliminated. The modifier is added to the wax or wax-like material in an amount which may fluctuate within wide limits depending upon the wax/or the modifying agent selected, the only requirement in this respect being that the modifier and wax should not be combined in proportions exceeding the limits of their mutual compatibility. In general, it is desirable to restrict the content of the modifier within the limits of from about 10% to about 25% by weight, but considerably higher or slightly lower proportions of this material are also within the scope of the present invention.

The modifying materials contained in the wax compositions of the present invention serve as plasticizers, moistureproofing substances or as combined plasticizing and moistureproofing agents.

Having thus indicated in a general way the nature of the invention, reference is made to the following specific examples for a more complete understanding thereof. Examples I–VI illustrate the proportions in parts per hundred the ingredients which were used in preparing the various forms of modified wax. The compositions were prepared and applied to Kraft paper in the following manner.

The indicated proportions of wax and modifying material were melted, intimately mixed and applied at suitable temperatures to the paper, the temperatures varying with the melting point of the wax composition. The lower melting compositions (85° C. or below) were applied directly by pouring the wax compositions onto the paper in front of the spreader knife and then smoothing to a uniform thickness. The higher melting compositions were rapidly brushed on the paper in order to avoid excessive penetration prior to passage under the spreading knife.

The coated paper products obtained in the above manner were tested for moisture vapor transmission in a Southwick G. F. M. V. T. machine, and compared with Kraft paper similarly coated with unmodified waxes. The results of these tests are given in the following examples.

*Example I*

| Paper | Average Thickness of Paper | Composition of Coating | Thickness of Coating | Grams M. V. T., 100 Sq. In., 24 hrs., 100° F., 95% RH |
|---|---|---|---|---|
| Kraft | *Inches* 0.005 | (a) Barnsdall M. C. Wax, 100%; Softening Point, 71° C. | *Inches* 0.0035 | 0.169 |
| Do | 0.005 | (b) Barnsdall M. C. Wax, 90%; Softening Point, 71° C. Mixture of Isomeric Terphenyls, 10%; Softening Point, 149° C. | 0.004 | 0.077 |

*Example II*

| Paper | Average Thickness of Paper | Composition of Coating | Thickness of Coating | Grams M. V. T., 100 Sq. In., 24 hrs., 100° F., 95% RH |
|---|---|---|---|---|
| Kraft | *Inches* 0.005 | (a) Socony Vacuum 2300 Wax, 100%; Softening Point, 62° C. | *Inches* 0.003 | 0.860 |
| Do | 0.005 | (b) Socony Vacuum 2300 Wax, 90%; Softening Point, 62° C. Mixture of Isomeric Terphenyls; Softening Point, 149° C. | 0.004 | 0.132 |

*Example III*

| Paper | Average Thickness of Paper | Composition of Coating | Thickness of Coating | Grams M. V. T., 100 Sq. In., 24 hrs., 100° F., 95% RH |
|---|---|---|---|---|
| Kraft | *Inches* 0.005 | (a) Hemp Wax, 100%; Softening Point, 61° C.-62° C. | *Inches* 0.0045 | 0.376 |
| Do | 0.005 | (b) Hemp Wax, 90%; Softening Point, 61° C.-62° C. Mixture of Isomeric Terphenyls, 10%; Softening Point, 149° C. | 0.004 | 0.139 |

*Example IV*

| Paper | Average Thickness of Paper | Composition of Coating | Thickness of Coating | Grams M. V. T., 100 Sq. In., 24 hrs., 100° F., 95% RH |
|---|---|---|---|---|
| Kraft | *Inches* 0.005 | (a) Hemp Wax, 100%; Softening Point, 61° C.-62° C. | *Inches* 0.0045 | 0.376 |
| Do | 0.005 | (b) Hemp Wax, 90%; Softening Point, 61° C.-62° C. Meta-terphenyl, 10%; Softening Point, 84° C.-85° C. | 0.0035 | 0.149 |

*Example V*

| Paper | Average Thickness of Paper | Composition of Coating | Thickness of Coating | Grams M. V. T., 100 Sq. In., 24 hrs., 100° F., 95% RH |
|---|---|---|---|---|
| Kraft | *Inches* 0.005 | (a) Yellow Ceresin, 100%; Softening Point, 69° C. | *Inches* 0.0045 | 0.111 |
| Do | 0.005 | (b) Yellow Ceresin, 90%; Softening Point, 69° C. Meta-terphenyl, 10%; Softening Point, 84° C.-85° C. | 0.0035 | 0.103 |

*Example VI*

| Paper | Average Thickness of Paper | Composition of Coating | Thickness of Coating | Grams M. V. T., 100 Sq. In., 24 hrs., 100° F., 95% RH |
|---|---|---|---|---|
| Kraft | *Inches* 0.005 | (a) Hemp Wax, 100%; Softening Point, 61° C.-62° C. | *Inches* 0.0045 | 0.376 |
| Do | 0.005 | (b) Hemp Wax, 20%; Softening Point, 61° C.-62° C. N-ortho-xenyl Stearamide, 80%; Softening Point, 57° C.-58° C. | 0.005 | 0.111 |

The foregoing examples clearly demonstrate that the above modifying agents substantially increase the resistance of the wax coating to moisture vapor transmission.

The modified wax coatings were in each instance tough and flexible and the modifying agent displayed no tendency to separate from the wax by crystallization.

The following examples illustrate additional compositions which were found to be particularly suitable for hot dipping artificial flowers made of crepe paper.

*Example VII*

| | Per cent |
|---|---|
| Meta terphenyl; softening point, 84–85° C | 25 |
| Paraffin; softening point, 53° C | 40 |
| Yellow ceresin; softening point, 69° C | 35 |

Softening point of mixture, 53° C.

Artificial crepe paper flowers were dipped in a molten bath prepared by heating the above composition to a temperature of about 80° C., whereupon the coated products were removed and vigorously shaken to remove the excess coating material.

Upon solidifying, the coating stiffened the flower petals without leaving thick edges and imparted a dull pleasing translucent appearance thereto.

*Example VIII*

| | Per cent |
|---|---|
| N-ortho xenyl stearamide; softening point, 59° C | 37 |
| Dallawax 89; softening point, 69° C | 60 |
| Hydrogenated Rosin; softening point, 98° C | 3 |

The composition was applied to artificial crepe flowers in the same manner and with substantially the same results except that the coating had a pale translucent tan color as distinguished from the white translucent color obtained in Example VII.

In addition to being suitable for hot dipping artificial flowers, the composition disclosed in Examples VII and VIII may be used for coating artificial fruit and similar decorative articles and also for moistureproofing paper, fabrics and other porous fibrous materials.

The foregoing examples are merely illustrative of the improved wax compositions and it is to be understood that the invention is not in any sense restricted thereto.

For example, a wide range of ingredients may be effectively substituted in place of those designated in the examples. Any vegetable, insect, synthetic or mineral wax or waxy substance or mixture of waxes or waxy substances may be used in place of the paraffin, ceresin, Barnsdall M. C. wax, Dallawax, hemp wax and Socony Vacuum #2300 wax used in the examples. Thus, in place of the waxes specifically mentioned, bayberry wax, beeswax, carnauba wax, candelilla wax, Chinese wax, Japan wax, montan wax, ozokerite, spermaceti, Opal wax, cetyl alcohol and similar waxes and wax-like substances may be used.

Moreover, modifying materials other than those specifically mentioned above may be employed and as further examples of these the following are listed.

1. Mixtures of isomeric terphenyls, S. P. 140–150° C.
2. Mixture of terphenyls consisting of about 70% meta terphenyl and about 30% para terphenyl.
3. Orthoterphenyl, S. P. 50–55° C.
4. Paraterphenyl, S. P. 212° C.
5. Hydrogenated terphenyls such as hydrogenated meta terphenyl (M. P. about 50° C.) and hydrogenated para terphenyl (M. P. 160° C.).
6. N-para xenyl stearamide, crystallization point 135.5–136° C.

The wax compositions of the present invention may include only a wax or waxy substance and a modifier of the above type or it may contain additional modifying agents. These compositions are excellent coating and impregnating materials which may be used in moistureproofing paper, paper board stock, cloth, regenerated cellulose, glassine, cellulose acetate and the like. They are preferably applied in the form of a hot melt to the base to be coated or impregnated, but may be used in the form of a solution or an emulsion.

The coatings produced from these compositions are free of air holes, are of even consistency and are tough, flexible, and resistant to weathering and severe changes in climatic conditions.

Where the word "wax" is used in the claims, it is to be understood that natural waxes, synthetic waxes and wax-like materials are contemplated.

Barnsdall MC wax and Socony Vacuum 2300 wax are microcrystalline products of petroleum origin which, according to H. Bennett (Commercial Waxes, Chemical Publishing Co., N. Y. 1944, page 60) have substantially the following properties.

| | Barnsdall Special Wax | Socony 2300 |
|---|---|---|
| Melting Point, °F | 160–165 | 155. |
| Specific Gravity at 60° F | 0.920–0.940 | |
| Specific Gravity at 210° F | 0.800–0.820 | |
| Viscos. at 210° F. (Sayb.) | 75–100 | 65. |
| Flash Point, ° F | 500 min | 495. |
| Fire Point, ° F | 575 min | 550. |
| Saponification No | 2 | |
| Acid No | 0.1–0.2 | |
| Color | White to Amber | Yellow-brown. |
| Penetration No.: (ASTM) (Petrolatum Method—77°F; 100 g. wt.) | 5–10 | 20–25. |

For a more detailed discussion of the properties of Socony Vacuum 2300 wax, reference is made to the Technical Bulletin of Socony-Vacuum Oil Co., August 1944, pages 1–12.

"Staybelite" is a resin obtained from the partly and completely hydrogenated acid and nonacid constituents of rosin. (Standard Chemical and Technical Dictionary, 1939 by H. Bennett.)

Dallawax 89 is a microcrystalline petrolatum blend having a softening point of 69° C.

As many widely different embodiments of this invention may be made without departing from the spirit and scope thereof, it is to be understood that the invention is not to be limited to the specific embodiments thereof, except as defined in the appended claims.

This application is a division of application, Serial Number 672,161, filed May 24, 1946.

What I claim is:

1. A hot dip coating and impregnating composition for artificial flowers, artificial fruit and the like consisting of 37% by weight of N-ortho xenyl stearamide (S. P. 59° C.), 60% by weight of a microcrystalline petrolatum blend having a softening point of 69° C. and 3% by weight of hydrogenated rosin having a softening point of 98° C.

2. Artificial paper flowers coated with a translucent wax composition consisting of 37% by weight of N-ortho xenyl stearamide (S. P. 59° C.), 60% by weight of a microcrystalline petrolatum blend having a softening point of 69° C. and 3% by weight of hydrogenated rosin having a softening point of 98° C.

JOE E. MOOSE.

REFERENCES CITED

The following references are of record in the file of this patent:

UNITED STATES PATENTS

| Number | Name | Date |
|---|---|---|
| 1,400,324 | Singer | Dec. 13, 1921 |
| 2,338,176 | Goepfert | Jan. 4, 1944 |
| 2,404,896 | Aelony | July 30, 1946 |

OTHER REFERENCES

National Paint Dictionary, Stewart, 3rd ed., Laros Printing Co., 1948, pp. 544–545. (Copy in division 64.)